US011834578B2

(12) United States Patent
Enomura et al.

(10) Patent No.: US 11,834,578 B2
(45) Date of Patent: Dec. 5, 2023

(54) BLACK PERYLENE PIGMENT MICROPARTICLES, METHOD OF PRODUCING THE SAME, BLACK PIGMENT COMPOSITION COMPRISING THE SAME, AND METHOD OF PRODUCING BLACK PERYLENE PIGMENT MICROPARTICLES HAVING CONTROLLED HUE AND/OR CHROMA

(71) Applicant: M. TECHNIQUE CO., LTD., Izumi (JP)

(72) Inventors: Masakazu Enomura, Izumi (JP); Kazutaka Takeda, Izumi (JP)

(73) Assignee: M. TECHNIQUE CO., LTD., Izumi (JP)

( * ) Notice: Subject to any disclaimer, the term of this patent is extended or adjusted under 35 U.S.C. 154(b) by 138 days.

(21) Appl. No.: 17/606,926

(22) PCT Filed: May 15, 2019

(86) PCT No.: PCT/JP2019/019317
§ 371 (c)(1),
(2) Date: Oct. 27, 2021

(87) PCT Pub. No.: WO2020/230293
PCT Pub. Date: Nov. 19, 2020

(65) Prior Publication Data
US 2022/0235227 A1  Jul. 28, 2022

(51) Int. Cl.
*C09B 3/18* (2006.01)
*C09B 67/54* (2006.01)
(52) U.S. Cl.
CPC ............ *C09B 3/18* (2013.01); *C09B 67/0096* (2013.01)

(58) Field of Classification Search
CPC ................................. C09B 3/18; C09B 7/0096
(Continued)

(56) References Cited

U.S. PATENT DOCUMENTS

| 2003/0127023 A1 | 7/2003 | Grandidier et al. |
| 2005/0016420 A1 | 1/2005 | Mizuguchi et al. |

(Continued)

FOREIGN PATENT DOCUMENTS

| CN | 1654546 A | 8/2005 |
| CN | 102279522 A | 12/2011 |

(Continued)

OTHER PUBLICATIONS

International Search Report for PCT/JP2019/019317 dated Aug. 13, 2019.

(Continued)

*Primary Examiner* — James E McDonough
(74) *Attorney, Agent, or Firm* — Birch, Stewart, Kolasch & Birch, LLP (57) ABSTRACT

The present application provides black perylene pigment microparticles having an average circularity of 0.8 or more which are amorphous; and a method of producing the black perylene pigment microparticles, which comprises a step of mixing a pigment solution in which a black perylene pigment is dissolved and a precipitation solvent for precipitating black perylene pigment microparticles from the pigment solution to form black perylene pigment microparticles, wherein at least one of the pigment solution and the precipitation solvent independently includes a salt of an alkaline earth metal and/or a particle growth inhibitor. The present invention can provide black perylene pigment microparticles having good dispersibility, high concealabil- (Continued)

ity and light-shielding property and controlled hue and chroma, and a method of easily producing the same, and the like.

10 Claims, 2 Drawing Sheets

(58) Field of Classification Search
USPC .......................................................... 106/493
See application file for complete search history.

(56) References Cited

U.S. PATENT DOCUMENTS

| | | |
|---|---|---|
| 2007/0151478 A1 | 7/2007 | Erk et al. |
| 2010/0184983 A1 | 7/2010 | Loebel et al. |
| 2010/0326321 A1 | 12/2010 | Enomura |
| 2012/0006230 A1 | 1/2012 | Enomura |

FOREIGN PATENT DOCUMENTS

| | | |
|---|---|---|
| EP | 1 413 605 A1 | 4/2004 |
| JP | 10-219167 A | 8/1998 |
| JP | 2003-41144 A | 2/2003 |
| JP | 2003-504480 A | 2/2003 |
| JP | 2007-522297 A | 8/2007 |
| JP | 2009-221266 A | 10/2009 |
| JP | 2012-68613 A | 4/2012 |
| JP | 2012-212051 A | 11/2012 |
| WO | WO2009/008388 A1 | 1/2009 |
| WO | WO-2013105522 A1 * | 7/2013 ............. B32B 27/06 |

OTHER PUBLICATIONS

Mizuguchi, "Color Generation Mechanism of the Black Perylene (p. B1. 31)", Journal of the Japan Society of Colour Material, 2000, vol. 73, No. 1, pp. 28-34.

Extended European Search Report dated Feb. 1, 2023 for Application No. 19928557.8.

Chinese Office Action and Search Report for Chinese Application No. 201980096343.3, dated Jul. 8, 2023, with an English translation of the Chinese Office Action.

* cited by examiner

BLACK PERYLENE PIGMENT MICROPARTICLES, METHOD OF PRODUCING THE SAME, BLACK PIGMENT COMPOSITION COMPRISING THE SAME, AND METHOD OF PRODUCING BLACK PERYLENE PIGMENT MICROPARTICLES HAVING CONTROLLED HUE AND/OR CHROMA

TECHNICAL FIELD

The present invention relates to black perylene pigment microparticles, a method of producing the same, a black pigment composition comprising the same, and a method of producing black perylene pigment microparticles having controlled hue and/or chroma.

BACKGROUND ART

Conventionally, carbon black, a black perylene pigment and the like have been used as a black pigment. Carbon black is most widely used as a black pigment, and has high coloring power, and is excellent in blackness, acid resistance, and weather resistance. However, since carbon black has low electrical resistance, it is difficult to apply it to applications requiring high resistance such as black matrix for a liquid crystal color filter and a black column spacer (Patent Literature 1). Further, when a black matrix or a black column spacer is formed on a glass substrate by a photolithography method, there is a problem that it is difficult to perform alignment because carbon black has a low light transmittance in the near infrared region (Patent Literature 2).

Since carbon black has the problem as described above, Patent Literatures 2 to 4 propose methods of using carbon black and a black perylene pigment in combination.

On the other hand, perylene pigments are widely used as robust pigments and exhibit red-violet-brown-black in a solid state, but their color tones are not always thermally stable (Patent Literature 1). Therefore, Patent Literature 1 proposes a black perylene pigment obtained by firing at least one compound selected from a diimide derivative of perylenetetracarboxylic acid and a diimide derivative of perylenediiminodicarboxylic acid at a temperature of 200 to 600° C. in a vacuum or under an inert gas atmosphere. A black perylene pigment having a butyl group was prepared by firing at 500° C. for 1 hour in Example 1. Though the black perylene pigment of Example 1 was excellent in weather resistance and heat resistance compared with an unfired black perylene pigment of Comparative Example 1, blackness and coloring power were not improved in terms of color tone.

CITATION LIST

Patent Literature

Patent Literature 1: JP 2003-041144
Patent Literature 2: JP 2012-068613
Patent Literature 3: JP H10-219167
Patent Literature 4: JP 2012-212051

SUMMARY OF THE INVENTION

Technical Problem

As mentioned above, the color tone of the perylene pigments is not always thermally stable. Patent Literature 1 attempted preparation of a black perylene pigment having high blackness and coloring power and excellent heat resistance and weather resistance by firing, but blackness and coloring power were not improved in terms of color tone. In addition, C. I. Pigment Black 31 and C. I. Pigment Black 32, which are typical black perylene pigments, have a valley of light absorption near 520 nm, so that the color tone is tinged in green, and is far from the so called blackish black.

Further, compounds classified as a peryleneimide, originally have a property of easy crystal growth, and tend to become needle crystals at pigmentation. Therefore, there is a problem that the dispersibility is poor and molding is difficult when forming a paste-like pigment composition. Further, packing of the pigment particles becomes sparse and gaps are formed, so that the concealability is lowered, the blackness becomes insufficient, and the display quality is inferior when used in a display device.

In particular, in a display device of a consumer device such as a smartphone, which is highly competitive in the market, it is required to accurately control the color tone in black as one of the requirements for display quality in order to differentiate products. Therefore, when a black perylene pigment without any problem of electrical resistance is used as a black pigment for a display device instead of carbon black, there is a problem that it is difficult to precisely control the color tone as described above.

Therefore, an object of the present invention is to provide a black perylene pigment having high concealability and light-shielding property and controlled hue and chroma. Another object of the present invention is to provide a method of easily producing the black perylene pigment, and the like.

Solution to the Problem

The present inventors have diligently studied, and have found that hue and/or chroma can be controlled by performing heat treatment under different conditions using black perylene pigment microparticles having an average circularity of 0.8 or more which are amorphous, and a black perylene pigment having high concealability and light-shielding property and controlled hue and chroma can be produced. Thus, the present invention has been accomplished. Namely, the present invention is as follows.

[1] The first embodiment of the present invention is black perylene pigment microparticles having an average circularity of 0.8 or more which are amorphous.

[2] The second embodiment of the present invention is the black perylene pigment microparticles according to [1], which have an average primary particle diameter of 80 nm or less.

[3] The third embodiment of the present invention is a method of producing the black perylene pigment microparticles according to [1] or [2], which comprises a step of mixing a pigment solution in which a black perylene pigment is dissolved and a precipitation solvent for precipitating black perylene pigment microparticles from the pigment solution to form black perylene pigment microparticles, wherein at least one of the pigment solution and the precipitation solvent independently includes a salt of an alkaline earth metal and/or a particle growth inhibitor.

[4] The fourth embodiment of the present invention is the method of producing black perylene pigment microparticles according to [3], wherein the alkaline earth metal is calcium.

[5] The fifth embodiment of the present invention is the method of producing black perylene pigment microparticles according to [3] or [4], wherein mixing the pigment solution and the precipitation solvent is carried out in a thin film fluid formed by introducing the pigment solution and the precipitation solvent into a space between at least two processing surfaces being capable of approaching to and separating from each other at least one of which rotates relative to the other.

[6] The sixth embodiment of the present invention is a black pigment composition comprising the black perylene pigment microparticles according to [1] or [2].

[7] The seventh embodiment of the present invention is a method of producing black perylene pigment microparticles having controlled hue and/or chroma or a black pigment composition comprising the black perylene pigment microparticles, by heat-treating the black perylene pigment microparticles according to [1] or [2], or the black pigment composition according to [6].

[8] The eighth embodiment of the present invention is the method of producing black perylene pigment microparticles or a black pigment composition comprising the black perylene pigment microparticles according to [7], wherein hue and/or chroma is controlled by controlling a time and/or a temperature of the heat treatment.

Advantageous Effects of the Invention

Hue and/or chroma can be controlled by performing heat treatment under different conditions using the black perylene pigment microparticles of the present invention, and a black perylene pigment having high concealability and light-shielding property and controlled hue and chroma can be produced. The present invention makes it possible to meet the market demand for display quality in display devices.

Black perylene pigment microparticles having controlled hue and/or chroma can be used in various applications that require high concealability and light-shielding property, such as inks, paints, inkjet inks, electrophotographic toners, and coloring pigments for rubber or plastics as well as black matrices and black column spacers for liquid crystal color filters that require high resistance values.

Further, the black perylene pigment microparticles of the present invention used for producing black perylene pigment microparticles having controlled hue and/or chroma can be produced by a relatively simple process such as adding a salt of an alkaline earth metal and/or a particle growth inhibitor.

DESCRIPTION OF THE INVENTION

1. Black Perylene Pigment Microparticles

The black perylene pigment microparticles of the present invention are characterized by having an average circularity of 0.8 or more and being amorphous.

The black perylene pigment used in the present invention includes a black pigment having a perylene skeleton. Specific examples thereof include black perylene pigments described in Patent Literature 1, JP 2007-522297, etc. Preferable black perylene pigments are peryleneimide-based black pigments such as C. I. Pigment Black 31, C. I. Pigment Black 32, and the like which are commercially available and widely used.

Circularity is measured by approximating the microparticle to an ellipse in the image of the microparticle and using the major axis (A), the peripheral length (L) and the area (S) of the ellipse, as described later. When the microparticle is a perfect sphere, the circularity is 1. The average circularity of the black perylene pigment microparticles of the present invention is 0.8 or more, preferably 0.85 or more, and more preferably 0.9 or more.

Since the black perylene pigment microparticles of the present invention have an average circularity of 0.8 or more, their shape is close to a spherical shape, the distances between the microparticles are uniformed, gaps between the microparticles are unlikely to be formed, and their concealability is high. In the present invention, respective circularities of all the microparticles do not have to be within the above range, and the average circularity as an average value may be within the above range.

Figure 3:
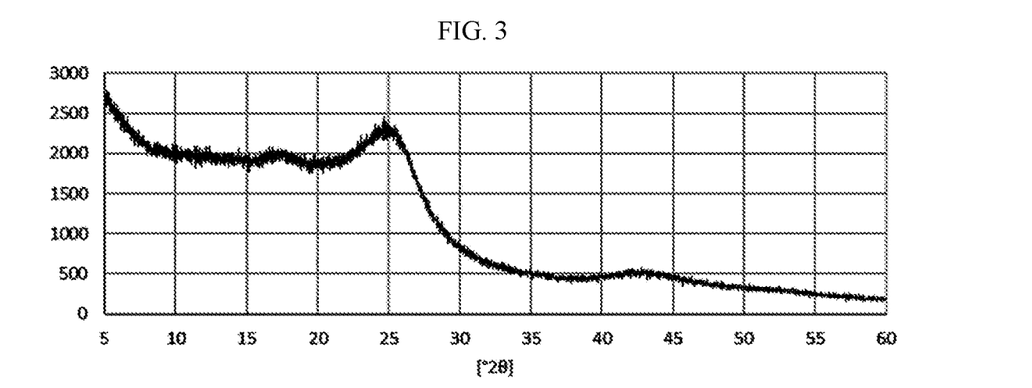
FIG. 3 shows a figure of the X-ray diffraction measurement result of the black perylene pigment microparticle of Example 1.

Crystallinity of the black perylene pigment microparticles can be confirmed by X-ray diffraction (XRD) measurement as described later. Being amorphous is confirmed by the fact that no peaks are observed by X-ray diffraction measurement. For example, FIG. 3 shows a figure of the X-ray diffraction measurement result of the black perylene pigment microparticle of Example 1, and it is judged to be amorphous since no peaks were observed.

The average primary particle diameter of the black perylene pigment microparticles of the present invention is preferably 80 nm or less from the viewpoint of providing a black pigment composition having dense packing, improved concealability and high light-shielding property. The average primary particle diameter is preferably 5 nm or more from the viewpoint of easy dispersibility of the pigment. The average primary particle diameter is more preferably in the range of 10 to 70 nm, further preferably in the range of 20 to 60 nm, and particularly preferably in the range of 30 to 55 nm. When the average primary particle diameter is in these ranges, a black pigment composition having denser packing of the black perylene pigment microparticles, further improved concealability and a higher light-shielding property can be provided. In the present invention, respective primary particle diameters of all the microparticles do not have to be in the above range, and the average primary particle diameter as an average value may be in the above range.

2. Method of Producing Black Perylene Pigment Microparticles

The method of producing black perylene pigment microparticles of the present invention is a method of producing the black perylene pigment microparticles which comprises a step of mixing a pigment solution in which a black perylene pigment is dissolved and a precipitation solvent for precipitating black perylene pigment microparticles from the pigment solution to form black perylene pigment microparticles, wherein at least one of the pigment solution and the precipitation solvent independently includes a salt of an alkaline earth metal and/or a particle growth inhibitor.

Examples of the pigment solution in which a black perylene pigment is dissolved, are solutions in which the black perylene pigment is dissolved in an aprotic organic solvent in the presence of an alkali.

As the aprotic organic solvent, any solvent can be used as long as it dissolves the black perylene pigment. Specific examples thereof are N-methylpyrrolidone, dimethylformamide, N,N-dimethylacetamide, dimethylimidazolidinone, dimethyl sulfoxide, sulfolane, acetone or acetonitrile, tetrahydrofuran, γ-butyrolactone, and the like, and preferably N-methylpyrrolidone and the like. These solvents can be used alone or in combination of two or more.

As the alkali that solubilizes the black perylene pigment, any alkali can be used as long as the object of the present invention can be achieved. Specific examples thereof are an alkali metal hydroxide, alkali metal alkoxide, alkaline earth metal hydroxide, alkaline earth metal alkoxide, quaternary ammonium hydroxide, and the like. Preferable examples thereof are a quaternary ammonium hydroxide such as benzyltrimethylammonium hydroxide. For example, those commercially available in the form of methanol solution and the like are easy to handle and are preferably used. These alkalis can be used alone or in combination of two or more.

Concentration of the black perylene pigment in the pigment solution is, for example, 0.2 to 10% by weight, preferably 0.5 to 5% by weight, and more preferably 1 to 3% by weight.

Examples of the precipitation solvent for precipitating the black perylene pigment microparticles from the pigment solution, are solvents having a low solubility of the black perylene pigment. Specific examples thereof are aqueous solvents such as water, a mixed solvent of a hydrophilic organic solvent and water, and a mixed solvent of a water-miscible organic solvent and water. Examples of the hydrophilic organic solvent are an alcohol such as methanol, ethanol and ethylene glycol; a ketone such as acetone; a sulfoxide such as dimethyl sulfoxide; an amide such as dimethylformamide and dimethylacetamide; a carboxylic acid such as acetic acid, and the like. Preferable are an alcohol such as methanol, ethanol and ethylene glycol, or the like. Examples of the water-miscible organic solvent are a nitrile such as acetonitrile; an ether such as tetrahydrofuran and dimethoxyethane, and the like. A preferable precipitation solvent is water. If necessary, a dispersant or an acid for neutralizing the alkali may be dissolved in the precipitation solvent. The organic solvent may be added, for example, when water alone is insufficient to uniformly dissolve the dispersant or the like, or when water alone is insufficient to obtain the viscosity required for circulation in the flow path.

A volume ratio of the pigment solution and the precipitation solvent at mixing may be appropriately changed and adjusted according to the concentration of the black perylene pigment in the pigment solution and the solubility of the black perylene pigment in the mixed liquid of the precipitation solvent and the pigment solution. The volume ratio of the pigment solution and the precipitation solvent is, for example, 1:100 to 1:1, preferably 1:40 to 1:2, more preferably 1:20 to 1:4, and further preferably 1:15 to 1:5.

At least one of the pigment solution and the precipitation solvent contains a salt of an alkaline earth metal and/or a particle growth inhibitor. As described in each Comparative Example described later, when neither a salt of an alkaline earth metal nor a particle growth inhibitor is added, circularity of the precipitated black perylene pigment microparticles is as low as about 0.5, and the particle diameter is also large.

Specific examples of the salt of the alkaline earth metal are a salt of calcium, magnesium, strontium or the like, and are preferably a calcium salt. Examples of the salt are an inorganic salt such as a nitrate, a hydrochloride and a sulfate, and a salt of an organic acid such as acetic acid and methanesulfonic acid. As described in Comparative Examples 2 and 3 described later, when the salt of the alkali metal such as sodium nitrate or potassium nitrate is added, circularity of the precipitated black perylene pigment microparticles is as low as about 0.5, and the particle diameter is also large. However, as described in Examples 1 to 8 described later, when the salt of the alkaline earth metal is added, circularity of the precipitated black perylene pigment microparticles is 0.85 or more, and a particle diameter thereof is 80 nm or less. As described above, by adding a salt of an alkaline earth metal, circularity of the black perylene pigment microparticles can be remarkably increased, and the particle diameter can be remarkably decreased.

The salt of the alkaline earth metal may be added to either one or both of the pigment solution and the precipitation solvent. Preferably, it is added to the precipitation solvent. When the salt of the alkaline earth metal is added to the precipitation solvent, concentration of the salt of the alkaline earth metal in the precipitation solvent is, for example, 0.05 to 5% by weight, preferably 0.1 to 2% by weight, and more preferably 0.2 to 1% by weight.

The particle growth inhibitor is a compound which has a hydrophobic group and a hydrophilic group, has an affinity for the carbon skeleton of the black perylene pigment molecule, and has a hydrophobic group lowering the growth rate at precipitation, and a hydrophilic group stabilizing the pigment microparticles in the precipitation solvent.

Preferable examples of the hydrophobic group having an affinity for the carbon skeleton of the black perylene pigment molecule and lowering the growth rate at precipitation, are an aliphatic group, an aryl group and the like. The aliphatic group has a linear, branched or cyclic aliphatic moiety, and may be either saturated or unsaturated, and includes, for example, an alkyl, an alkenyl, a cycloalkyl or a cycloalkenyl which may be unsubstituted or substituted with a substituent. Further, the aryl group may be either a monocyclic ring or a condensed ring, and includes, for example, a phenyl or a naphthyl which may be unsubstituted or substituted with a substituent.

As the hydrophilic group stabilizing the pigment microparticles in the precipitation solvent, any hydrophilic group can be used as long as the object of the present invention can be achieved. Preferable examples are an amino group, an ammonium group, a hydroxyl group, a carboxyl group or a conjugate base thereof, and the like can be used.

Specific examples thereof are an aliphatic amine such as a $C_6$-$C_{20}$ alkylamine including octylamine, hexadecylamine and the like; an unsaturated aliphatic amine such as a $C_6$-$C_{20}$ alkenylamine including oleylamine and the like; a quaternary ammonium salt such as a $C_6$-$C_{20}$ alkyltrimehylammonium salt including hexadecyltrimethylammonium salt and the like, and a benzyltrimethylammonium salt; an aliphatic alcohol such as a $C_6$-$C_{20}$ alkanol including octanol, hexadecanol and the like; a fatty acid salt such as a $C_6$-$C_{20}$ alkanoic acid salt including sodium laurate and sodium myristate, and the like.

Further, the hydrophilic group may be a group which can be changed to a structure having hydrophilicity as a result of a chemical reaction such as hydrolysis. Specific examples of the particle growth inhibitor are a silane coupling agent such as alkylalkoxysilane and arylalkoxysilane, and examples thereof are dodecyltrimethoxysilane, trimethoxyphenylsilane and the like.

As described in Examples 9 to 16 described later, when the particle growth inhibitor is added, circularity of the precipitated black perylene pigment microparticles is 0.88 or more, and a particle diameter thereof is 80 nm or less. As described above, by adding the particle growth inhibitor, circularity of the black perylene pigment microparticles can be remarkably increased, and the particle diameter can be remarkably decreased.

The particle growth inhibitor may be added to either one or both of the pigment solution and the precipitation solvent. Preferably, it is added to the pigment solution. When the particle growth inhibitor is added to the pigment solution, concentration of the particle growth inhibitor in the pigment solution is, for example, 0.01 to 5% by weight, preferably 0.05 to 2% by weight, and more preferably 0.1 to 1% by weight.

Mixing the pigment solution and the precipitation solvent is preferably carried out in a thin film fluid formed by introducing the fluids into a space between at least two processing surfaces being capable of approaching to and separating from each other at least one of which rotates relative to the other. Specifically, a forced thin film type microreactor manufactured by M Technique Co., Ltd., may be used, which is shown in JP 2010-189661.

There are no particular restrictions in the conditions under which the black perylene pigment microparticles are precipitated. The pressure at precipitation may be selected from, for example, a range of from normal pressure to subcritical and supercritical conditions. The temperature may be, for example, −30 to 100° C., preferably −10 to 60° C., and more preferably 0 to 30° C. The concentration of the black perylene pigment microparticles in the mixed liquid after precipitation is not particularly limited, but is, for example, in the range of 10 to 40,000 mg, preferably in the range of 50 to 20,000 mg, more preferably in the range of 100 to 10,000 mg with respect to 1,000 mL of the mixed liquid.

3. Black Pigment Composition

The black perylene pigment microparticles of the present invention can be used by blending into a black pigment composition. Other components contained in the black pigment composition differ depending on the application of the black pigment composition used, and examples thereof include components usually used for each application. In addition, the black pigment composition can be produced by mixing with these components according to a conventional method. Specific examples of the applications are inks, paints, inkjet inks, electrophotographic toners, colored pigments for rubber or plastics, and black matrices and black column spacers for liquid crystal color filters that require high resistance values.

4. Method of Producing Black Perylene Pigment Microparticles Having Controlled Hue and/or Chroma, or the Like The black perylene pigment microparticles having controlled hue and/or chroma, or a black pigment composition comprising the black perylene pigment microparticles, can be produced by heat-treating the black perylene pigment microparticles of the present invention, or the black pigment composition comprising the black perylene pigment microparticles of the present invention.

Crystallization of the amorphous black perylene pigment microparticles is promoted, and the hue and/or chroma thereof can be adjusted, for example, by heat-treating the black perylene pigment microparticles of the present invention in a suspension state. Examples of a solvent used for the suspension is water, and is preferably ion-exchanged water wherein salts are removed from water in order to suppress aggregation of the black perylene pigment microparticles. The heat treatment is preferably performed in water in the presence of a substance capable of being adsorbed on the surface of the black perylene pigment microparticles and serving as a protective agent, such as a surfactant. Aggregation and particle growth can be suppressed by these substances.

Temperature of the heat treatment is appropriately selected according to the desired hue and/or chroma, but it is preferable to heat-treat at a temperature of the boiling point of water or higher by using a sealed can such as an autoclave. Specific examples of the temperature are 100 to 400° C., preferably 120 to 300° C., and more preferably 150 to 250° C. Time of the heat treatment is appropriately selected depending on the desired hue and/or chroma, and examples thereof are 10 minutes to 5 hours, preferably 20 minutes to 2 hours, and more preferably 30 minutes to one hour and a half. As described in Examples described later, the hue and/or chroma can be clearly adjusted by performing the heat treatment at 150 to 200° C. for 1 hour. In Patent Literature 1, the blackness and the coloring power are not changed by the heat treatment at 500° C. for 1 hour. Therefore, the effect of the heat treatment in the present invention is a remarkable effect unpredictable to a person skilled in the art.

The heat treatment of the black perylene pigment microparticles of the present invention is described above. The hue and/or chroma of the black pigment microparticles of the present invention contained in the black pigment composition can be similarly controlled by heat-treating the black pigment composition comprising the black perylene pigment microparticles of the present invention.

5. Black Perylene Pigment Microparticles Having Controlled Hue and/or Chroma

The black perylene pigment microparticles having controlled hue and/or chroma produced in 4. above, can be used, for example, as a black pigment composition by blending into a black pigment composition. A black pigment composition comprising the black perylene pigment microparticles having controlled hue and/or chroma produced in 4. above, can also be used as it is as a black pigment composition.

Other components contained in the black pigment composition differ depending on the application of the black pigment composition used, and examples thereof are components usually used for each application. A black pigment composition can be produced by mixing with these components according to a conventional method. Specific examples of the applications are inks, paints, inkjet inks, electrophotographic toners, colored pigments for rubber and plastics, and black matrices and black column spacers for liquid crystal color filters that require high resistance values.

6. Method of Controlling Hue and/or Chroma of Black Perylene Pigment Microparticles According to the present invention, a method of controlling hue and/or chroma of black perylene pigment microparticles by heat-treating amorphous black perylene pigment microparticles is provided.

Examples of the amorphous black perylene pigment microparticles to be heat-treated are preferably black perylene pigment microparticles having an average circularity of 0.8 or more and an average primary particle diameter of 80 nm or less.

The heat treatment is as described above. By performing the heat treatment in the same manner as described above, the hue and/or chroma of the black perylene pigment microparticles can be controlled.

EXAMPLE

Hereinafter, the present invention is explained in more detail with reference to Examples and Comparative Examples, but the present invention is not limited only to these Examples. The terms "part" and "%" below are based on mass unless otherwise specified.

[Measurement of Particle Diameter and Circularity]

Particle diameters and circularities of the black perylene pigment microparticles of Examples and Comparative Examples were determined by transmission electron microscope (TEM) observation as follows.

The pigment particle dispersion was dropped onto the mesh with a support film, and dried. The dried sample as a sample was observed using the transmission electron microscope JEM-2100 (JEOL Ltd.) at an acceleration voltage of 80 kV. Subsequently, 100 particles were selected in the image taken at 50,000 times, and were approximated as ellipses one by one using the TEM image analysis software iTEM (Olympus Soft Imaging Solutions GmbH). Next, the major axis (A), peripheral length (L) and area (S) of the ellipse of the projected image of the pigment particles, were obtained from the analysis results of the TEM image analysis software.

Since the dispersion was dried on the mesh with a support film as described above during the measurement, even if the black perylene pigment microparticles were well dispersed in the dispersion, they aggregated on appearance in the drying process, and thereby, it was difficult to determine the exact particle shape. In such a case, the image analysis was performed on 100 independent particles that did not overlap.

The average value of the major axis (A) of the ellipse for 100 particles of the photographed image was calculated, and was used as the average primary particle diameter.

Circularity is a value calculated by the equation (1) using the peripheral length (L) and area (S) of the approximated ellipse formed by approximating the projected image of a certain single pigment particle as an ellipse. As circularity is closer to 1, the particle is closer to a sphere. When the particle shape is a true sphere, the circularity is a maximum value of 1.

$$\text{Circularity} = 4\pi S/L^2 \tag{1}$$

The average value of the circularities of 100 particles of the photographed image was calculated, and was used as the average circularity.

[Measurement of Crystallinity]

Crystallinity of the black perylene pigment microparticles of Examples and Comparative Examples was confirmed by X-ray diffraction (XRD) measurement as follows.

X-ray diffraction was measured using the dry powders of the black perylene pigment microparticles as a sample, and using a powder X-ray diffraction measuring device EMPYREAN (Spectris Plc., PANalytical Division), with CuKα ray as the X-ray source and the measurement range of 5 to 60° as 2θ. When peaks for the test sample were scattered in the X-ray diffraction measurement, X-ray diffraction of the standard sample was measured under the same conditions as one of the test sample, and the peak position and half-value width were obtained from each X-ray diffraction pattern by the analysis performed using the powder X-ray diffraction comprehensive software HighScore Plus (Spectris Plc., PANalytical Division), and the crystallite size was obtained by the analysis program of Scheller's equation.

[Measurement of Reflectance Spectrum (% R), Hue H, Chroma C and Optical Density OD]

The reflectance spectrum (% R) was measured using the dry powders of the black perylene pigment microparticles of Examples and Comparative Examples as a sample, using an integrating sphere unit in the ultraviolet-visible near-infrared spectrophotometer V-770 (JASCO Corporation) with a measurement range of 200 to 2,500 nm.

The hue and chroma of the black perylene pigment microparticles of Examples and Comparative Examples were determined using the reflectance spectrum (% R) measurement results as follows.

The hue, chroma and optical density were obtained the following equations (2), (3) and (4) using the color values in the CIE-Lab color system and the CIE-XYZ color system obtained by using the measurement/analysis software Spectrum Manager Ver. 2 spectrum analysis (JASCO Corporation) from measurement results. In the following, the color value of the CIE-Lab color system is simply referred to as "L*a*b* value".

$$\text{Hue } H = b^*/a^* \tag{2}$$

$$\text{Chroma } C = ((a^*)^2 + (b^*)^2)^{1/2} \tag{3}$$

$$\text{Optical density OD} = \log(100/Y) \tag{4}$$

First, a case where a salt of an alkaline earth metal is added to precipitate the black perylene pigment microparticles, is described according to Examples 1 to 8.

Example 1

15 parts of the black perylene pigment of C. I. Pigment Black 31 was suspended in 960 parts of N-methyl-2-pyrrolidone (Kishida Chemical Co., Ltd.) at 25° C. in an air atmosphere. Next, 25 parts of a 40% benzyltrimethylammonium hydroxide methanol solution (Tokyo Chemical Industry Co., Ltd.) was added thereto to dissolve the black perylene pigment to prepare the pigment solution (1). 50 parts of calcium nitrate tetrahydrate (Kanto Chemical Co., Inc.) was dissolved in 9,950 parts of ion-exchanged water at 25° C. in an air atmosphere to prepare the precipitation solvent (1) for precipitating black perylene pigment microparticles.

Using a forced thin film microreactor ULREA (M Technique Co., Ltd.), the precipitation solvent (1) was sent as the first fluid at 300 mL/min, and the pigment solution (1) was sent as the second fluid at 30 mL/min. Then, the precipitation solvent (1) and the pigment solution (1) were introduced and mixed in the space between the disks rotating at 1,700 rpm to obtain a suspension containing the black perylene pigment microparticles. In each example, the first fluid and the second fluid are the same as those described in JP 2010-189661 described above.

The perylene-based pigment microparticles contained in the suspension were collected by filtration through vacuum filtration using a hard filter paper (serve opening 1 μm) and washed with ion-exchanged water three times to obtain a wet cake of the black perylene pigment microparticles. Dispersant Neogen R-K (DSK Co., Ltd.) was dissolved in ion-exchanged water, and a wet cake of the black perylene pigment microparticles obtained after washing was dispersed in the above solution, and was irradiated with ultrasonic waves for 15 minutes using an ultrasonic homogenizer GSD50CF (Ginsen Co., Ltd.) to prepare a pigment microparticle dispersion.

The wet cake of the black perylene pigment microparticles that was not used in the preparation of the dispersion was dried under a reduced pressure under the condition of −0.1 MPaG to obtain dry powders.

Example 2

Using a forced thin film type microreactor ULREA (M Technique Co., Ltd.), the same precipitation solvent (1) as in Example 1 was sent as the first fluid at 500 mL/min, and the same pigment solution (1) as in Example 1 was sent at 100 mL/min. Then, the precipitation solvent (1) and the pigment solution (1) were introduced and mixed in the space between the disks rotating at 5,000 rpm to obtain a suspension containing the black perylene pigment microparticles. Operations other than the above were performed in the same manner as in Example 1.

Example 3

20 parts of calcium sulfate dihydrate (Kanto Chemical Co., Inc.) was dissolved in 9,980 parts of ion-exchanged water at 25° C. in an air atmosphere to prepare the precipitation solvent (2) for precipitating black perylene pigment microparticles. Using a forced thin film type microreactor ULREA (M Technique Co., Ltd.), the precipitation solvent (2) was sent as the first fluid at 300 mL/min, and the same pigment solution (1) as in Example 1 was sent as the second fluid at 30 mL/min. Then, the precipitation solvent (2) and the pigment solution (1) were introduced and mixed in the space between the disks rotating at 1,700 rpm to obtain a suspension containing the black perylene pigment microparticles. Operations other than the above were performed in the same manner as in Example 1.

Example 4

37 parts of calcium acetate monohydrate (Kanto Chemical Co., Inc.) was dissolved in 9,963 parts of ion-exchanged water at 25° C. in an air atmosphere to prepare the precipitation solvent (3) for precipitating black perylene pigment microparticles. Using a forced thin film type microreactor ULREA (M Technique Co., Ltd.), the precipitation solvent (3) was sent as the first fluid at 300 mL/min, and the same pigment solution (1) as in Example 1 was sent as the second fluid at 30 mL/min. Then, the precipitation solvent (3) and the pigment solution (1) were introduced and mixed in the space between the disks rotating at 1,700 rpm to obtain a suspension containing the black perylene pigment microparticles. Operations other than the above were performed in the same manner as in Example 1.

Example 5

24 parts of calcium chloride (Kanto Chemical Co., Inc.) was dissolved in 9,976 parts of ion-exchanged water at 25° C. in an air atmosphere to prepare the precipitation solvent (4) for precipitating black perylene pigment microparticles. Using a forced thin film type microreactor ULREA (M Technique Co., Ltd.), the precipitation solvent (4) was sent as the first fluid at 300 mL/min, and the same pigment solution (1) as in Example 1 was sent as the second fluid at 30 mL/min. Then, the precipitation solvent (4) and the pigment solution (1) were introduced and mixed in the space between the disks rotating at 1,700 rpm to obtain a suspension containing the black perylene pigment microparticles. Operations other than the above were performed in the same manner as in Example 1.

Example 6

50 parts of calcium nitrate tetrahydrate (Kanto Chemical Co., Inc.) and 13 parts of 60% nitric acid (Kanto Chemical Co., Inc.) were dissolved in 9,937 parts of ion-exchanged water at 25° C. in an air atmosphere to prepare the precipitation solvent (5) for precipitating black perylene pigment microparticles. Using a forced thin film type microreactor ULREA (M Technique Co., Ltd.), the precipitation solvent (5) was sent as the first fluid at 300 mL/min, and the same pigment solution (1) as in Example 1 was sent as the second fluid at 30 mL/min. Then, the precipitation solvent (5) and the pigment solution (1) were introduced and mixed in the space between the disks rotating at 1,700 rpm to obtain a suspension containing the black perylene pigment microparticles. Operations other than the above were performed in the same manner as in Example 1.

Example 7

54 parts of magnesium nitrate hexahydrate (Kanto Chemical Co., Inc.) and 13 parts of 60% nitric acid (Kanto Chemical Co., Inc.) were dissolved in 9,933 parts of ion-exchanged water at 25° C. in an air atmosphere to prepare the precipitation solvent (6) for precipitating black perylene pigment microparticles. Using a forced thin film type microreactor ULREA (M Technique Co., Ltd.), the precipitation solvent (6) was sent as the first fluid at 300 mL/min, and the same pigment solution (1) as in Example 1 was sent as the second fluid at 30 mL/min. Then, the precipitation solvent (6) and the pigment solution (1) were introduced and mixed in the space between the disks rotating at 1,700 rpm to obtain a suspension containing the black perylene pigment microparticles. Operations other than the above were performed in the same manner as in Example 1.

Example 8

45 parts of strontium nitrate (Kanto Chemical Co., Inc.) and 13 parts of 60% nitric acid (Kanto Chemical Co., Inc.) were dissolved in 9,942 parts of ion-exchanged water at 25° C. in an air atmosphere to prepare the precipitation solvent (7) for precipitating black perylene pigment microparticles. Using a forced thin film type microreactor ULREA (M Technique Co., Ltd.), the precipitation solvent (7) was sent as the first fluid at 300 mL/min, and the same pigment solution (1) as in Example 1 was sent as the second fluid at 30 mL/min. Then, the precipitation solvent (7) and the pigment solution (1) were introduced and mixed in the space between the disks rotating at 1,700 rpm to obtain a suspension containing the black perylene pigment microparticles. Operations other than the above were performed in the same manner as in Example 1.

Comparative Example 1

Using a forced thin film type microreactor ULREA (M Technique Co., Ltd.), ion-exchanged water was sent as the first fluid at 300 mL/min, and the same pigment solution (1) as in Example 1 was sent as the second fluid at 30 mL/min. Then, the ion-exchanged water and the pigment solution (1) were introduced and mixed in the space between the disks rotating at 1,700 rpm to obtain a suspension containing the black perylene pigment microparticles. Operations other than the above were performed in the same manner as in Example 1.

Comparative Example 2

36 parts of sodium nitrate (Kanto Chemical Co., Inc.) was dissolved in 9,964 parts of ion-exchanged water at 25° C. in an air atmosphere to prepare the precipitation solvent (8) for precipitating black perylene pigment microparticles. Using a forced thin film type microreactor ULREA (M Technique Co., Ltd.), the precipitation solvent (8) was sent as the first fluid at 300 mL/min, and the same pigment solution (1) as in Example 1 was sent as the second fluid at 30 mL/min. Then, the precipitation solvent (8) and the pigment solution (1) were introduced and mixed in the space between the disks rotating at 1,700 rpm to obtain a suspension containing the black perylene pigment microparticles. Operations other than the above were performed in the same manner as in Example 1.

Comparative Example 3

43 parts of potassium nitrate (Kanto Chemical Co., Inc.) was dissolved in 9,957 parts of ion-exchanged water at 25° C. in an air atmosphere to prepare the precipitation solvent (9) for precipitating black perylene pigment microparticles. Using a forced thin film type microreactor ULREA (M Technique Co., Ltd.), the precipitation solvent (9) was sent as the first fluid at 300 mL/min, and the same pigment solution (1) as in Example 1 was sent as the second fluid at 30 mL/min. Then, the precipitation solvent (9) and the pigment solution (1) were introduced and mixed in the space between the disks rotating at 1,700 rpm to obtain a suspension containing the black perylene pigment microparticles. Operations other than the above were performed in the same manner as in Example 1.

The particle diameter and circularity of the black perylene pigment microparticles prepared in respective Examples and Comparative Examples were confirmed by the transmission electron microscope (TEM) observation. As is clear from the results in Table 1, when a salt of an alkaline earth metal coexisted in the preparation of the particles according to the present invention, it can be understood that the black perylene pigment microparticles having a nearly spherical shape were obtained.

rolidone (Kishida Chemical Co., Ltd.) at 25° C. in an air atmosphere. Next, 25 parts of a 40% benzyltrimethylammonium hydroxide methanol solution (Tokyo Chemical Industry Co., Ltd.) and 5 parts of octylamine were added thereto to dissolve the black perylene pigment to prepare the pigment solution (2).

Using a forced thin film type microreactor ULREA (M Technique Co., Ltd.), ion-exchanged water was sent as the first fluid at 300 mL/min, and the pigment solution (2) was sent as the second fluid at 30 mL/min. Then, the ion-exchanged water and the pigment solution (2) were introduced and mixed in the space between the disks rotating at 1,700 rpm to obtain a suspension containing the black perylene pigment microparticles. Operations other than the above were performed in the same manner as in Example 1.

Example 10

5 parts of hexadecylamine were used instead of 5 parts of octylamine in the pigment solution (2) of Example 9. The conditions other than the above were the same as those of Example 9.

Example 11

5 parts of oleylamine were used instead of 5 parts of octylamine in the pigment solution (2) of Example 9. The conditions other than the above were the same as those of Example 9.

Example 12

5 parts of hexadecyltrimethylammonium bromide were used instead of 5 parts of octylamine in the pigment solution

TABLE 1

| Sample | Composition of First fluid [wt %] | Rotation number [rpm] | Flow rate of Liquid A [mL/min] | Flow rate of Liquid B [mL/min] | Particle diameter [nm] | Circularity |
|---|---|---|---|---|---|---|
| Example 1 | $Ca(NO_3)_2 \cdot 4H_2O/H_2O$ = 0.50/99.50 | 1,700 | 300 | 30 | 37.5 | 0.896 |
| Example 2 | $Ca(NO_3)_2 \cdot 4H_2O/H_2O$ = 0.50/99.50 | 5,000 | 500 | 100 | 51.6 | 0.868 |
| Example 3 | $CaSO_4 \cdot 2H_2O/H_2O$ = 0.20/99.80 | 1,700 | 300 | 30 | 54.5 | 0.855 |
| Example 4 | $Ca(C_2H_3O_2)_2 \cdot H_2O/H_2O$ = 0.37/99.63 | 1,700 | 300 | 30 | 45.5 | 0.891 |
| Example 5 | $CaCl_2/H_2O$ = 0.24/99.76 | 1,700 | 300 | 30 | 53.4 | 0.888 |
| Example 6 | $Ca(NO_3)_2 \cdot 4H_2O/60\% HNO_3/H_2O$ = 0.50/0.13/99.37 | 1,700 | 300 | 30 | 39.1 | 0.902 |
| Example 7 | $Mg(NO_3)_2 \cdot 6H_2O/60\% HNO_3/H_2O$ = 0.54/0.13/99.33 | 1,700 | 300 | 30 | 38.0 | 0.918 |
| Example 8 | $Sr(NO_3)_2/60\% HNO_3/H_2O$ = 0.45/0.13/99.42 | 1,700 | 300 | 30 | 44.7 | 0.896 |
| Comparative Example 1 | $H_2O$ = 100.00 | 1,700 | 300 | 30 | 91.2 | 0.491 |
| Comparative Example 2 | $NaNO_3/H_2O$ = 0.36/99.64 | 1,700 | 300 | 30 | 129.4 | 0.539 |
| Comparative Example 3 | $KNO_3/H_2O$ = 0.43/99.57 | 1,700 | 300 | 30 | 121.7 | 0.543 |

Next, a case where a particle growth inhibitor is added to precipitate the black perylene pigment microparticles is described according to Examples 9 to 16.

Example 9

15 parts of the black perylene pigment of C. I. Pigment Black 31 was suspended in 955 parts of N-methyl-2-pyr- (2) of Example 9. The conditions other than the above were the same as those of Example 9.

Example 13

5 parts of octanol were used instead of 5 parts of octylamine in the pigment solution (2) of Example 9. The conditions other than the above were the same as those of Example 9.

Example 14

5 parts of hexadecanol were used instead of 5 parts of octylamine in the pigment solution (2) of Example 9. The conditions other than the above were the same as those of Example 9.

Example 15

5 parts of dodecyltrimethoxysilane were used instead of 5 parts of octylamine in the pigment solution (2) of Example 9. The conditions other than the above were the same as those of Example 9.

Example 16

5 parts of trimethoxyphenylsilane were used instead of 5 parts of octylamine in the pigment solution (2) of Example 9. The conditions other than the above were the same as those of Example 9.

The particle diameter and circularity of the black perylene pigment microparticles prepared in Examples 9 to 16 were confirmed by the transmission electron microscope (TEM) observation. As is clear from the results in Table 2, when a particle growth inhibitor coexisted in the preparation of the particles according to the present invention, it can be understood that the black perylene pigment microparticles having a nearly spherical shape were obtained.

TABLE 2

| Sample | Particle growth inhibitor | Particle diameter [nm] | Circularity |
| --- | --- | --- | --- |
| Example 9 | Octylamine | 36.3 | 0.882 |
| Example 10 | Hexadecylamine | 46.0 | 0.883 |
| Example 11 | Oleylamine | 58.9 | 0.890 |
| Example 12 | Hexadecyltrimethylammonium bromide | 45.5 | 0.899 |
| Example 13 | Octanol | 30.9 | 0.897 |
| Example 14 | Hexadecanol | 30.4 | 0.909 |
| Example 15 | Dodecyltrimethylsilane | 31.4 | 0.912 |
| Example 16 | Trimethoxyphenylsilane | 25.7 | 0.909 |

Figure 1:
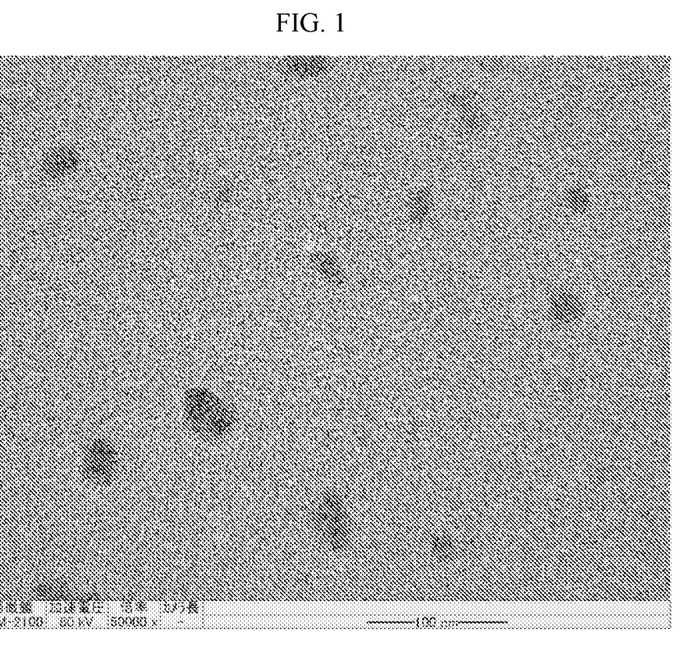
FIG. 1 shows a transmission electron microscope (TEM) image of the black perylene pigment microparticles of Example 1.
Figure 2:
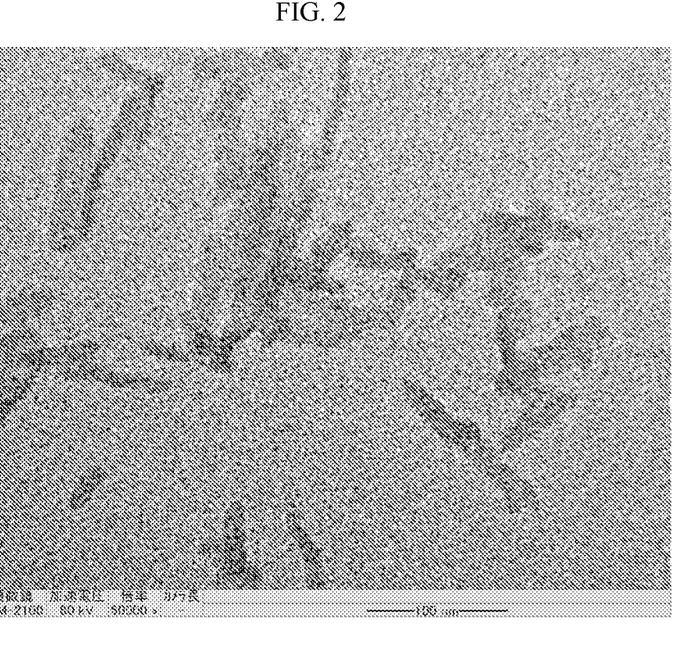
FIG. 2 shows a transmission electron microscope (TEM) image of the black perylene pigment microparticles of Comparative Example 1.

TEM images of Example 1 and Comparative Example 1 as representative examples are shown in FIG. 1 and FIG. 2, respectively.

The crystallinity of the black perylene pigment microparticles prepared in respective Examples and Comparative Examples was confirmed by X-ray diffraction (XRD) measurement. As a result of X-ray diffraction measurement, only the halo diffraction images were confirmed in the dry powders of the black perylene pigment microparticles produced in respective Examples, and thus, the dry powders were amorphous. As a result of X-ray diffraction measurement, broad diffraction patterns were confirmed in the dry powders of the black perylene pigment microparticles produced in Comparative Examples.

<Crystalization of Black Perylene Pigment Microparticles by Heat Treatment>

The dry powders of the black perylene pigment microparticles prepared in Example 2 were suspended in ion-exchanged water, sealed in an autoclave, and heat-treated respectively at 150° C., 175° C., and 200° C. for 1 hour using in a constant temperature bath AVO-250N (AS ONE Corporation). The wet cake containing the black perylene pigment microparticles was separated by centrifuging the suspension after the heat treatment, and dried under a reduced pressure under the condition of −0.1 MPaG to obtain dry powders.

X-ray diffraction measurements were performed for the dry powders of the black perylene pigment microparticles obtained after drying, and the crystallite sizes were calculated. An X-ray diffraction pattern of the crystal appeared by the heat treatment, and as the processing temperature increased, the X-ray diffraction pattern became sharper and the crystallite size increased (Table 3).

<Control of Hue and/or Chroma of Black Perylene Pigment Microparticles by Heat Treatment>

Reflectance spectrum (% R) of the respective black perylene pigment microparticles obtained by heat treatment were measured, and the hue, chroma and optical densities were confirmed.

Table 3 shows the crystallite size, L*a*b* values, hue, chroma and optical densities of the black perylene pigment microparticles obtained after the heat treatment. From the results in Table 3, it can be understood that when the black perylene pigment microparticles obtained in the present invention were heat-treated, the chroma decreases, the L* decreases, and the optical density increases as the heat treatment temperature increases.

TABLE 3

|  | Befor heat treatment | 150° C. | 175° C. | 200° C. |
| --- | --- | --- | --- | --- |
| Crystallite size [nm] | — | 2.1 | 3.9 | 6.4 |
| L* | 11.94 | 10.92 | 9.17 | 8.98 |
| a* | 13.34 | 4.97 | 4.04 | 2.77 |
| b* | 11.02 | 7.96 | 5.30 | 3.72 |
| Hue H | 0.83 | 1.60 | 1.31 | 1.34 |
| Chroma C | 17.30 | 9.38 | 6.66 | 4.64 |
| Optical density OD | 1.85 | 1.90 | 1.99 | 2.00 |

Figure 4:
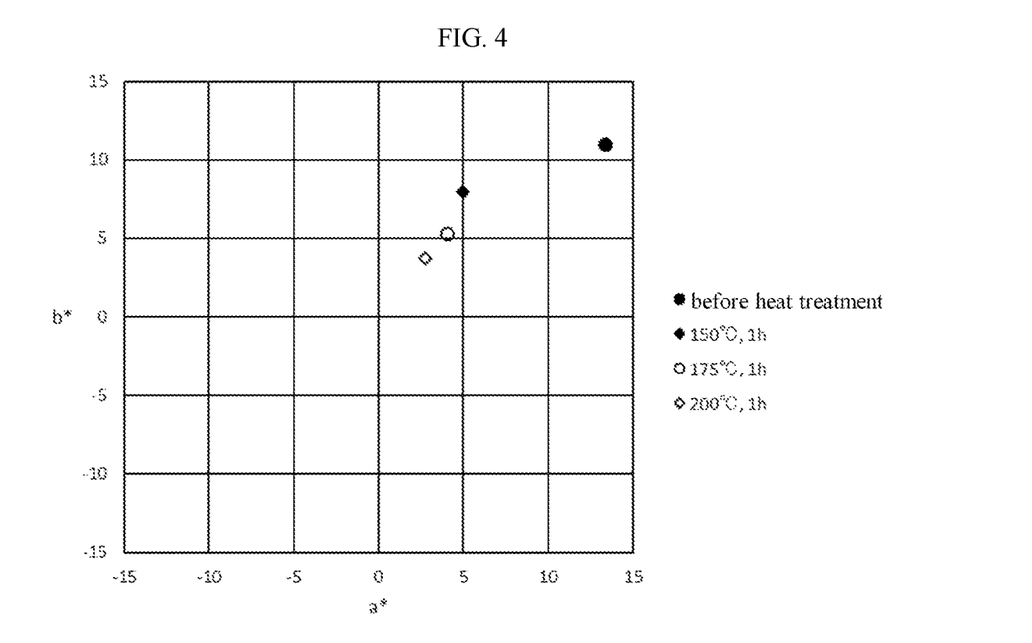
FIG. 4 shows a figure plotting a* and b* on the CIE-Lab color system chromaticity diagram shown in Table 3.

FIG. 4 shows a figure plotting a* and b* on the CIE-Lab color system chromaticity diagram shown in Table 3. It can be understood that b*/a* tended to decrease as the heat treatment temperature increases, and was approaching the origin (a*=0, b*=0).

INDUSTRIAL APPLICABILITY

The present invention can provide black perylene pigment microparticles having high concealability and light-shielding property and controlled hue and chroma, and a method of easily producing the same, and the like.

The invention claimed is:

1. Black perylene pigment microparticles having an average circularity of 0.8 or more which are amorphous.

2. The black perylene pigment microparticles according to claim 1, which have an average primary particle diameter of 80 nm or less.

3. A method of producing the black perylene pigment microparticles according to claim 1, which comprises a step of mixing a pigment solution in which a black perylene pigment is dissolved and a precipitation solvent for precipitating black perylene pigment microparticles from the pigment solution to form black perylene pigment microparticles, wherein at least one of the pigment solution and the precipitation solvent independently includes a salt of an alkaline earth metal and/or a particle growth inhibitor.

4. The method of producing black perylene pigment microparticles according to claim 3, wherein the alkaline earth metal is calcium.

5. The method of producing black perylene pigment microparticles according to claim 3, wherein mixing the pigment solution and the precipitation solvent is carried out in a thin film fluid formed by introducing the pigment solution and the precipitation solvent into a space between at least two processing surfaces being capable of approaching to and separating from each other at least one of which rotates relative to the other.

6. A black pigment composition comprising the black perylene pigment microparticles according to claim 1.

7. A method of producing black perylene pigment microparticles having controlled hue and/or chroma, by heat-treating the black perylene pigment microparticles according to claim 1.

8. The method of producing black perylene pigment microparticles according to claim 7, wherein hue and/or chroma is controlled by controlling a time and/or a temperature of the heat treatment.

9. A method of producing a black pigment composition comprising black perylene pigment microparticles, by heat-treating the black pigment composition according to claim 6.

10. The method of producing a black pigment composition comprising black perylene pigment microparticles according to claim 9, wherein hue and/or chroma is controlled by controlling a time and/or a temperature of the heat treatment.

* * * * *